United States Patent [19]

Ferrante

[11] Patent Number: 4,514,479
[45] Date of Patent: Apr. 30, 1985

[54] METHOD OF MAKING NEAR INFRARED POLARIZERS

[75] Inventor: Ronald A. Ferrante, Ridgecrest, Calif.

[73] Assignee: The United States of America as represented by the Secretary of the Navy, Washington, D.C.

[21] Appl. No.: 165,000

[22] Filed: Jul. 1, 1980

[51] Int. Cl.³ .................. G03H 1/18; G03C 5/00; C23F 1/02
[52] U.S. Cl. ........................................ 430/2; 430/1; 430/318; 430/321; 430/323; 156/643
[58] Field of Search ............... 430/1, 2, 321, 318, 430/323; 156/643

[56] References Cited

U.S. PATENT DOCUMENTS

| | | | |
|---|---|---|---|
| 2,224,214 | 10/1940 | Brown | 88/55 |
| 2,287,598 | 6/1942 | Brown | 88/65 |
| 2,964,635 | 12/1960 | Harrick | 250/86 |
| 3,046,839 | 7/1962 | Bird et al. | 88/65 |
| 3,235,630 | 2/1966 | Doherty et al. | 264/1 |
| 3,291,550 | 12/1966 | Bird et al. | 350/147 |
| 3,536,373 | 10/1970 | Bird et al. | 350/147 |
| 3,622,220 | 1/1971 | Kogelnik | 350/3.5 |
| 3,945,825 | 3/1976 | Gale et al. | 430/2 |
| 4,025,411 | 5/1977 | Hom-Ma et al. | 156/643 |
| 4,057,460 | 11/1979 | Saxena et al. | 156/643 |
| 4,092,442 | 5/1978 | Agnihotri et al. | 430/318 |

OTHER PUBLICATIONS

Sauter, G. F. et al., *Rev. Sci. Instrum.*, vol. 41, No. 10, 10/1970.

*Primary Examiner*—Charles L. Bowers, Jr.
*Attorney, Agent, or Firm*—Robert F. Beers; W. Thom Skeer; Kenneth G. Pritchard

[57] ABSTRACT

A method of producing near infrared polarizers is disclosed using holographic techniques. The interference pattern from two intersecting laser beams is used to produce a plane grating in a layer of photoresist which has been deposited on a layer of conductive material which in turn has been used to coat a substrate. Ion milling reproduces the plane grating in the conductive material layer by selectively etching away a uniform level of material.

6 Claims, 4 Drawing Figures

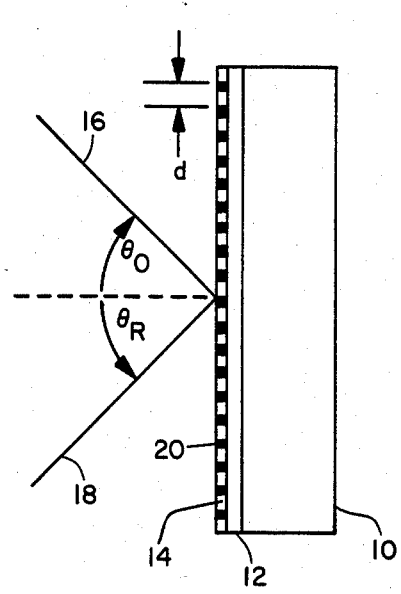
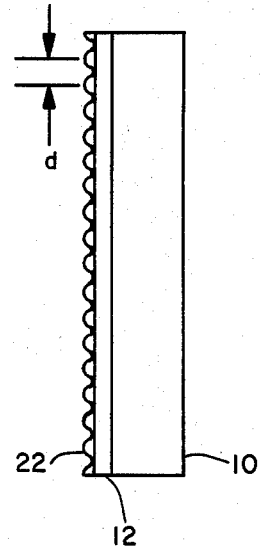
FIG. 1          FIG. 2
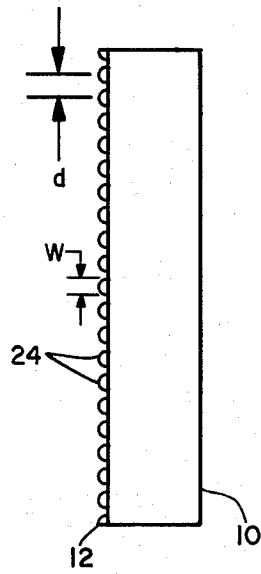
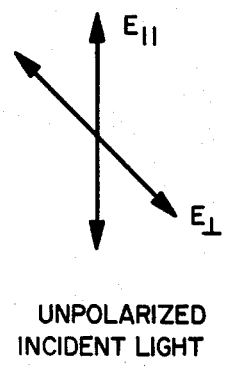
FIG. 3          FIG. 4

METHOD OF MAKING NEAR INFRARED POLARIZERS

BACKGROUND OF THE INVENTION

1. Field of the Invention

This invention relates to holographic techniques for fabricating high spatial frequency thin film wire grid polarizers. In particular, this is for thin film wire grid polarizers in the near infrared region of the spectrum.

2. Description of the Prior Art

Conventional wire grid polarizers are used for operation from 1 to 1000 μm. In the 20 to 1000 μm range, the grids are produced by contact printing a grating mask onto a photoresist layer covering an aluminized plastic substrate, followed by chemical etching. Etchant undercuttings set an upper limit to the grid's spatial frequency. This limits use to wavelengths longer than 20 μm.

For the 1 to 30 μm range, two different methods are currently in use. The first technique is a blaze diffraction grating which is mechanically ruled on a highly polished substrate such as ZnSe. This is followed by vacuum deposition of aluminum at an oblique angle to form the conductive wires at the groove peaks. Wire grid polarizers produced by this method are limited by the ruling machine resolution to use at wavelengths longer than about 2 μm. This method is relatively expensive due to the precision machining and polishing required.

In the second technique, wire grid polarizers are fabricated by first holographically recording a grating in photoresist. This is accomplished by recording a two-beam laser interference pattern. The chemically developed photoresist surface's relief grating is then illuminated at an oblique angle to produce the conductive grid pattern. This method is expensive and resolution limited to wavelengths longer than 1 μm.

Resolution limitations inherent in these conventional fabrication techniques limit their use to wavelengths longer than about 2 μm if high polarization is required. Chemical etching techniques are limited to spatial frequencies less than 1000 l/mm, limiting use to wavelengths greater than 20 μm. Machine ruling methods can yield 1000 to 1500 l/mm for application at wavelengths longer than 2 to 3 μm. Aluminized holographically recorded wire grids are capable of fabricating grid patterns of 2000 to 4000 l/mm corresponding to usage at wavelengths of 1 to 2 μm.

Thus it can be seen that a technology void exists to fill the need for high efficiency polarizers below the 1.0 μm spectral region. Polarizers currently used in this region are polaroid-thin film polarizers. They suffer from an increase in unpolarized light transmittance which reduces obtainable dynamic range. An increase in unpolarized light transmittance of greater than 10% is sufficient to defeat current techniques.

It is an object of the present invention to produce wire grids which extend the useful wavelength range below the 1 μm cutoff of conventionally produced high efficiency grids. It is another object of the present invention to produce polarizers for the infrared region corresponding to the 1.0 μm to 1000 μm wavelength range.

It is a further object of the present invention to describe a technology capable of producing wire grids of better than 4300 l/mm with variable wire width.

This and other objects of the present invention will become clear upon further reading of the present invention.

SUMMARY OF THE INVENTION

Construction of infrared polarizers with wire grids of better than 4300 l/mm is accomplished by a four step process. The first step is to coat a layer of conductive material on a substrate. The substrate should have high transmission for the spectral region desired and the conductive coating should be highly conductive in that same spectral region. Next, a layer of photoresist is deposited over the conductive coating. The photoresist is then exposed in the third step to an interference pattern of two beams from a laser source which records a plane grating in the photoresist. The photoresist is then developed to produce a surface relief grating. The last step requires milling the surface relief grating employing commercial ion milling techniques to reproduce the relief surface on the transparent conductive material.

DESCRIPTION OF THE DRAWINGS

FIG. 1 shows the interference pattern recorded in the layer of photoresist;

FIG. 2 shows the developed layer of photoresist in the present invention;

FIG. 3 shows the layer of transparent conductor on a substrate after ion milling the present invention; and FIG. 4 shows the effective wire grid produced in the present invention.

DESCRIPTION OF THE PREFERRED EMBODIMENT

FIG. 1 shows a general configuration of the method used in the present invention to produce near infrared polarizers. A substrate 10 is chosen with high transmission in the spectral region of interest, such as glass in the very near infrared region. Substrate 10 is coated with a thin layer of transparent conductive material 12 which can be aluminum, silver, gold, indium oxide, or some other material which is highly conductive in the spectral region desired. The examples given are for the near infrared region. The depth of layer 12 should be from 100Å to 500Å. Above conductor 12, a thin layer of photoresist 14, from 1 to 5 μm, is deposited over layer 12 by spin or dip coating. Positive photoresist types are preferable to insure adhesion without the need for over-exposing.

The next step calls for photoresist 14 to be exposed to a two-beam laser interference pattern represented by beams 16 and 18, which represent an object beam and reference beam respectively, to record a plane grating 20. The grating has a spatial frequency which is given as a function of the interbeam angle by the grating equation $$\nu = \text{spatial frequency} = \frac{n(\sin\theta_o + \sin\theta_R)}{\lambda_a} \quad (1)$$

where n = photoresist refractive index
$\lambda_a$ = exposing wavelength
$\theta_O$, $\theta_R$ = angle of incidence of object and reference waves measured in the material.

The fringe spacing itself is given by the equation $$d = \lambda_a/(\sin\theta_o + \sin\theta_R) \quad (2)$$

The maximum angle of incidence is determined by Snell's law $$\sin 90° = n \sin \theta_{max} = 1 \quad (3)$$

Assuming an index of 1.70 for the photoresist $$\theta_{max} = \arcsin(1/n) = 36° \quad (4)$$

The reasonable exposing wavelength for the value of $\lambda_a$ is 4579 Angstroms, which represents the argon ion laser line. In general, the photoresist refractive index will be in the range from approximately 1.66 to 1.70.

From the above it can be shown that the maximum obtainable spatial frequency is $$\nu_{max} = (1.7)\frac{[\sin 36° + \sin 36°]}{4579\,\text{Å}} = 4368\ 1/mm \quad (5)$$

with a corresponding fringe spacing $$d = \text{fringe spacing} = \frac{1}{\nu_{max}} = 0.23\ \mu m \quad (6)$$

The next step in developing polarizers is to chemically develop the exposed photoresist 14 to produce a surface relief grating 22 shown in FIG. 2. This structure will typically be of intermediate shape, somewhere between pure sinusoidal and pure squarewave, depending upon exposure level and processing used.

The final processing stage involves ion milling the sample. This reproduces the photoresist surface relief onto the surface of transparent conductor 12 as shown in FIG. 3.

This produces a high spatial frequency wire grid pattern as shown. Commercially available ion milling devices generate ions which are accelerated across a potential difference such that sufficient energies are achieved to displace surface atoms, resulting in high resolution milling. Resolutions of up to 1000 Angstroms are available without undercutting. This is equivalent to 10,000 1/mm.

The sample is ion milled to a sufficient depth to eliminate electrical contact between adjacent lines 24. Line width, w, can also be varied by varying ion milling depth in order to optimize polarizer performance.

Operation of the polarizer can be described as follows. Assume that unpolarized light is incident on the wire grid 26 as shown in FIG. 4. The electric field can be resolved into two orthogonal components, one parallel ($E_\parallel$) and one perpendicular ($E_\perp$) to the grid pattern. The field component $E_\parallel$, parallel to the grid is absorbed by the free conduction band electrons of the metal, generating a current in the wire. Energy is transferred from the field to the grid in the form of joule heating, produced by electronic interaction with the atoms of the metallic lattice. The accelerated electrons also reradiate in the forward and backward directions. The backward direction emissions appear as an unimportant reflected wave. The forward wave tends to cancel with the incident wave front.

Since the electrons cannot propagate in the direction perpendicular to the wire, this field component $E_\perp$ is passed without attenuation. Unpolarized light is therefore polarized by the grid in the direction perpendicular to the grid pattern.

The percent of polarization is defined as $$P = \frac{I_{max} - I_{min}}{I_{max} + I_{min}} \quad (7)$$

where $I_{max}$ = irradiance of the transmitted component
$I_{min}$ = irradiance of the absorbed component.

The polarization efficiency is increased as the ratio of light wavelength to grid wire width is increased. Thus, $$V = \frac{\text{illumination wavelength}}{\text{grid wire width}} \quad (8)$$

For a given P value, the minimum wavelength that can be effectively polarized by the wire grid is determined by the wire width, w.

It is clear to those skilled in the art that numerous other variations of thin wire polarizers can be made from the above description. The particular values used for the near infrared region are exemplary only and do not limit the spectral range at which this method could produce polarizers.

What is claimed is:

1. A method of making thin film wire grid polarizers for the infrared spectral region comprising the steps of:
   coating a layer of material transparent to said spectral region on a substrate with high transmission in said spectral region;
   depositing a layer of photoresist over said coating;
   exposing said layer of photoresist to a two-beam laser interference pattern where a grating is recorded which is given as functions of the interbeam angle by the grating equation.

$$\nu = \frac{n(\sin\theta_o + \sin\theta_R)}{\lambda_a}$$

where
   $\nu$ = spatial frequency,
   n = photoresist refractive index, $\lambda_a$ = exposing wavelength, and
   $\theta_o \theta_R$ = angle of incidence of object and reference waves measured in the photoresist:
   developing said exposed photoresist to produce a surface relief grating; and
   ion milling the surface relief grating to reproduce the relief surface in said transparent material.

2. A method of making thin film wire grid polarizers for the infrared spectral region as described in claim 1 wherein said coating step further comprises a layer of material 100Å to 500Å thick.

3. A method of making thin film wire grid polarizers for the infrared spectral region as described in claim 1 wherein said depositing step further comprises a layer of photoresist 1 to 5 $\mu$m thick.

4. A method of making thin film wire grid polarizers for the infrared spectral region as described in claim 2 wherein said layer of material is chosen from the group consisting of aluminum, silver, gold, or indium oxide.

5. A method of making thin film wire grid polarizers for the infrared spectral region as described in claim 1 wherein said layer of photoresist is deposited by spin coating.

6. A method of making thin film wire grid polarizers for the infrared spectral region as described in claim 1 wherein said layer of photoresist is deposited by dip coating.

* * * * *